June 9, 1936.  E. A. FORSBERG  2,043,350
CENTRIFUGAL MACHINE
Filed Jan. 18, 1933
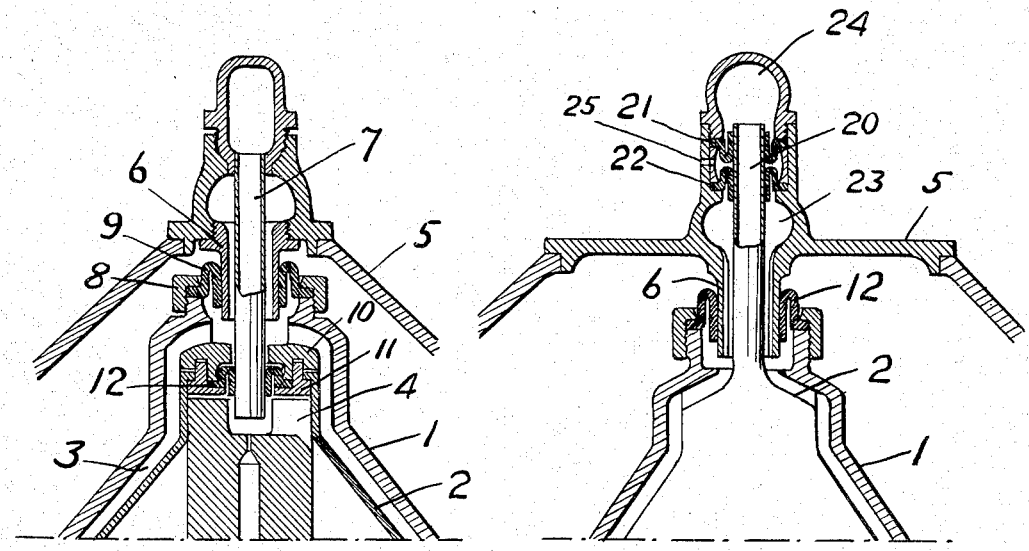
FIG. 1.  FIG. 2.
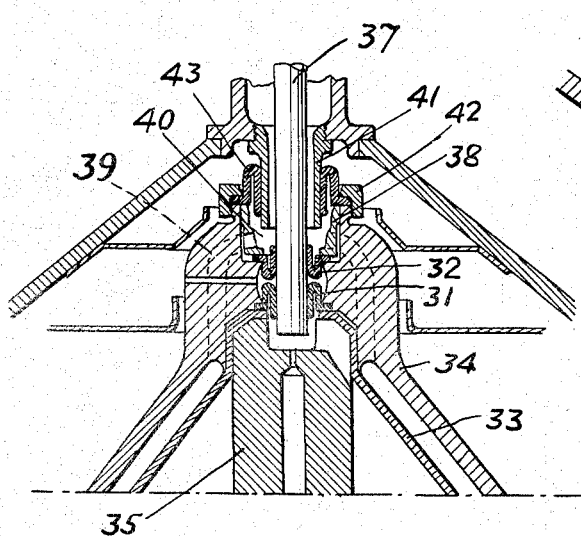 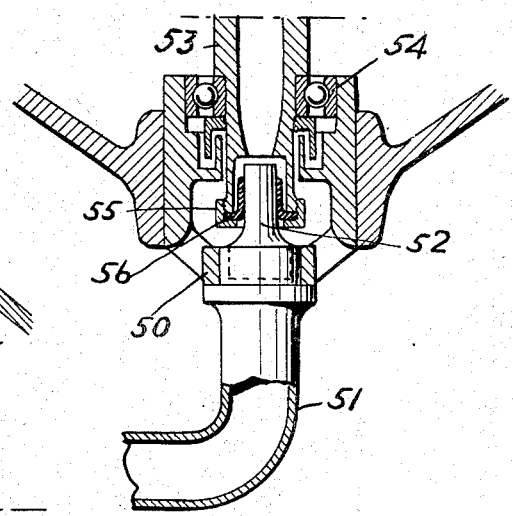
FIG. 3.  FIG. 4.
INVENTOR
Erik August Forsberg
BY
Busser and Harding
ATTORNEYS.
WITNESS:

Patented June 9, 1936

2,043,350

UNITED STATES PATENT OFFICE 2,043,350

CENTRIFUGAL MACHINE

Erik August Forsberg, Stockholm, Sweden, assignor to The De Laval Separator Company, New York, N. Y., a corporation of New Jersey Application January 18, 1933, Serial No. 652,291
In Sweden February 8, 1932

5 Claims. (Cl. 233—1)

In an application filed by Hans Olof Lindgren September 18, 1931, Ser. No. 563,539, now matured into Patent No. 1,969,226, dated August 7, 1934, there is disclosed a centrifugal machine of the closed circulation type comprising a centrifugal bowl and a hollow shaft or spindle rotating therewith and communicating with the interior of the bowl, a stationary pipe, a chamber affording fluid communication between said pipe and shaft, and an elastic collar having one free end surrounding and contacting with the shaft and its other end secured in fixed relation with the chamber, whereby the free end of the collar is subject to the pressure of the liquid flowing from the fixed pipe to the bowl or from the bowl to the fixed pipe, thus utilizing said fluid pressure to maintain the free end of the collar in tightening relation with the rotating hollow shaft.

A tightening device of this character is operative but is open to certain objections which it is the object of the present invention to eliminate. The present invention is characterized by the fact that one or more of the elastic collars with which the centrifugal machine is equipped rotates with the bowl and embraces and effects a tight joint with a stationary element. One advantage of the improvement is that the part of the machine which is in contact with the free end of the collar is a stationary part, thereby practically eliminating wear. Another advantage of the improvement is that any necessary replacement of said part involves no replacement of any element carried by the bowl, thereby not only making such replacement easier but also avoiding such risk of impairing the balance of the bowl as is involved in any replacement of a bowl part.

Several of many possible embodiments of the invention are shown in the drawing:

Fig. 1 is a vertical sectional view of one embodiment of the invention.

Figs. 2, 3 and 4 are vertical sectional views showing other embodiments of the invention.

Referring first to Fig. 1:

The bowl 1 (only the upper part of which is shown) is provided with a top disc 2, affording a passage 3 between it and the bowl hood for the outflow of the heavier separated liquid, e. g. skim milk. The lighter separated liquid, e. g. cream, discharges under and within the top disc 2 through the passage 4. Secured to and depending from the stationary enclosing frame 5 is a skim milk outflow pipe 6 communicating with the passage 3. Also secured to and depending from the stationary enclosing frame 5 is a cream outflow pipe 7 communicating with the passage 4.

By means of a flanged ring 8 an elastic collar 9 is secured at one end to the top of the bowl hood, its other free end embracing and contacting with the stationary skim milk outflow pipe 6. Thereby there is formed a chamber communicating with passage 3 and pipe 6 and enclosing the free end of the collar, which is thus subject to the pressure of the skim milk flowing from passage 3 to the pipe 6 and is maintained in tightening relation with the pipe 6.

Between interlocking rings 10 and 11 engaging the upper end of the top disc 2, one end of an elastic collar 12 is confined, the other free end of the collar embracing and contacting with the stationary pipe 7. Thereby there is formed a chamber communicating with passage 4 and pipe 7 and enclosing the free end of the collar, which is subject to the pressure of the cream flowing from passage 4 to pipe 7, with which the free end of the collar is thus maintained in tightening relation.

Figure 2 illustrates a combination of rotating and stationary collars. As in Fig. 1, the collar 12 is fixed in the bowl hood and rotates with it. The cream is discharged through a tube 20 which is fixed to the top disc 2 and is embraced by collars 21 and 22 secured to the fixed frame 5. The collar 22 is subject to the pressure of the skim milk flowing through pipe 6 into the skim milk outflow chamber 23. The collar 21 is subject to the pressure of the cream flowing through the tube 20 into the cream outflow chamber 24. The chamber between collars 21 and 22 communicates with the atmosphere (or any outside chamber) through an opening 25, so that any separated liquid leaking past one of the collars 21 or 22 will escape through this opening without danger of leaking past the other collar and thus mixing with the other separated liquid. This last described construction is set forth in an application filed by Hans Olof Lindgren September 18, 1931, Ser. No. 563,540.

Fig. 3 shows a construction which is the same in principle as that of Fig. 1 and differs in detail therefrom in that the tightening device around the stationary skim milk outlet tube is positioned above the tightening devices around the stationary cream discharge tube. In this construction the collar 31 and the upper end of the top disc 33 is confined between the top of the bowl hood 34 and the bowl member 35, the collar being subjected to the pressure of the light separated liquid flowing through the chamber 36 from the central part of the bowl into the tube 37. The collar 32 is confined between the top of the bowl hood 34 and a securing ring 38, through which and the bowl hood top is a heavy liquid outflow passage 39 communicating with the space above and outside the top disc and with a chamber 40 communicating with the stationary heavy liquid discharge tube 41. By means of a ring 42 threaded on the upper end of the bowl hood top, one end of the collar 43 is confined against the upper faces of the bowl hood top and the securing ring 38, the free end of the collar 43 embracing the tube 41 and being subject to the pressure within the chamber 40.

Fig. 4 shows the adaptation of the invention to the lower end of the shaft carrying the centrifugal bowl. The mixture to be separated or clarified is introduced through a pipe 51 secured to a fixed frame 50. To pipe 51 is threaded an upstanding tube 52. The hollow shaft 53 of the bowl rotates in bearings 54 in the frame 50. The lower end of shaft 53 surrounds and is spaced from the tube 52. By means of a flanged ring 55 threaded onto the lower end of shaft 53, one end of an elastic collar 56 is secured fixedly to the shaft 53, the free end of the collar surrounding the stationary tube 52 and being held in tightening relation therewith by the pressure of the inflowing mixture.

What I claim and desire to protect by Letters Patent is:

1. A centrifugal machine comprising a stationary tube, a centrifugal bowl and an element rotating therewith having a fluid passage communicating with the interior of the bowl and a chamber affording fluid communication between said passage and said stationary tube, an elastic collar having a part surrounding and contacting with the stationary tube and exposed to the fluid pressure within said chamber, and means securing another part of the collar to said rotating element so as to rotate therewith.

2. A centrifugal machine comprising a stationary tube, a centrifugal bowl and an element rotating therewith, an elastic collar having a part surrounding and contacting with the stationary tube, and means providing a chamber communicating with the interior of the bowl and said stationary tube and securing another part of the collar to the rotating element so as to rotate therewith, thereby permitting fluid pressure to maintain the first named part of the collar in tightening relation with the stationary tube.

3. A centrifugal machine comprising a stationary tube, a centrifugal bowl and an element rotatable therewith, an elastic collar having a free end surrounding and contacting with said tube, and means securing the other end of the collar to said element so as to rotate therewith, said securing means including, around the free end of the collar, a chamber adapted to receive fluid pressure to maintain the free end of the collar in tightening relation with the tube.

4. A centrifugal machine comprising a centrifugal bowl, two tubes, one of which communicates with the peripheral part of the bowl and the other of which communicates with a relatively central part of the bowl, one of said tubes being stationary and the other rotating with the bowl, an elastic collar having a part surrounding and contacting with the stationary tube, means securing another part of the collar so as to rotate with the bowl, an elastic collar having a part surrounding and contacting with the rotating tube, and means securing another part of the last named collar in stationary position.

5. A centrifugal machine comprising a centrifugal bowl, two tubes, one of which communicates with the peripheral part of the bowl and the other of which communicates with a relatively central part of the bowl, one of said tubes being stationary and the other rotating with the bowl, an elastic collar having a part surrounding and contacting with the stationary tube, means securing another part of the collar so as to rotate with the bowl, an elastic collar having a part surrounding and contacting with the rotating tube, and means securing another part of the last named collar in stationary position, said elements, tubes and collars being arranged to form chambers communicating with the respective tubes and wherein outflowing fluid under pressure maintains the respective collars in tightening relation with their respective tubes.

ERIK AUGUST FORSBERG.